UNITED STATES PATENT OFFICE 2,268,169

PRODUCT AND PROCESS

John Carl Sauer, Wilmington, Del., assignor to E. I. du Pont de Nemours & Company, Wilmington, Del., a corporation of Delaware No Drawing. Application June 22, 1939, Serial No. 280,653

13 Claims. (Cl. 260—550)

This invention relates to ethenones of the type RR'C=C=O, wherein R and R' are alkyl or substituted alkyl groups containing collectively at least fourteen carbon atoms. Still more particularly it relates to the production of these ethenones by dehydrohalogenation of secondary acyclic monoacyl halides of the formula

RR'CH—CO—X wherein X is halogen.

This invention has as an object the provision of a process for the preparation of new ethenones. A further object is the class of ethenones thus prepared. Another object is the provision of new treating agents for cellulosic materials. A still further object is the provision of new acylating agents. Other objects will appear hereinafter.

These objects are accomplished by the following invention wherein a secondary aliphatic monoacyl halide RR'CH—COX, wherein R and R' are alkyl or substituted alkyl groups, containing collectively at least fourteen carbon atoms and X is halogen, is reacted with an aliphatic tertiary amine in an inert solvent, the reaction and the isolation of the dialkylethenones being carried out under anhydrous conditions. The stable monomeric products, dialkylethenones of at least sixteen aliphatic carbon atoms of the formula RR'C=C=O, wherein R and R' are alkyl, including substituted alkyl, groups collectively containing at least fourteen carbon atoms are also comprised in the invention.

The general method for preparing the higher dialkylethenones comprises dissolving one equivalent amount of the appropriate acyl halide in an inert solvent, adding one equivalent amount of trialkylamine and quickly sealing the reaction vessel to avoid contact with moisture. The reverse procedure can be employed, i. e., the acyl halide can be added to the amine. The contents of the reaction vessel are agitated, and, if necessary, cooled to offset any heat of reaction. At 25° C., the time required for complete reaction is ordinarily 16-24 hours, depending on the acyl halide and the trialkylamine used. The reaction mixture (containing the higher dialkylethenone and the tertiary amine hydrochloride) need not be worked up immediately after completion of the reaction but may be kept indefinitely, provided moisture is excluded. The precipitated trialkylamine hydrochloride is preferably isolated by indirect filtration to avoid contact with air. In the indirect filtration, the filtrate is forced through the filter by means of nitrogen pressure (see Organic Syntheses, vol. XVI, page 82). The ordinary direct filtration can also be employed successfully to remove the trialkylamine hydrochloride, but, when this procedure is used, atmospheric moisture should be excluded. The filtrate containing the ethenone is then fractionally distilled.

A most important condition of the reaction is that the whole reaction (including isolation of the product) takes place under anhydrous conditions.

A convenient method for determining when the reaction is completed involves filtering a small portion of the reaction mixture and adding a drop or two of the trialkylamine to the clear filtrate. If the reaction is complete (i. e., all the acyl halide used up), further precipitation of trialkylamine hydrochloride is impossible and the filtrate remains clear. Likewise, if a primary amine (i. e., aniline) is added to the clear filtrate, precipitation of amine hydrochloride can not take place if the reaction is complete, although a heat effect may be noticed due to the reaction of the ethenone with the primary amine.

The more detailed practice of the invention is illustrated by the following examples, wherein parts given are by weight. There are of course many forms of the invention other than these specific embodiments.

EXAMPLE I

Diheptylethenone ($(C_7H_{15})_2C$=C=O)

To 2-heptylnonanoyl chloride (24 parts) in anhydrous benzene (180 parts) is added an excess of trimethylamine (20 parts). The reaction vessel is sealed and the reaction mixture is maintained at room temperature for 29 hours. A small portion of the mixture is removed from the reaction vessel, filtered, and the filtrate treated with aniline. There is no precipitation of aniline hydrochloride (proving that no acid chloride is present), yet there is a definite heat effect, thus indicating the presence of the ketene group. The main reaction mixture is then filtered by the indirect method to avoid contact with atmospheric moisture (80% of the theoretical amount of trimethylamine hydrochloride is thus isolated) and the filtrate is fractionally distilled. Diheptylethenone boiling at 133-5° C./5 mm. ($n^{27}_D$, 1.4432) is obtained (12 parts or 58% of the theoretical amount).

Anal. calc'd. for $C_{16}H_{30}O$: Mol. wt., 240. Found: Mol. wt. 250.

A portion of this ethenone rapidly acylated aniline to yield the anilide of 2-heptylnonanoic acid melting at 92-3° C. A mixed melting point with an authentic specimen showed no depression.

The 2-heptylnonanoyl chloride is prepared in about 80% yield from the corresponding acid and thionyl chloride. The same method may be used to prepare the other secondary acyl halides.

EXAMPLE II

*Ethyldodecylethenone* $(C_2H_5(C_{12}H_{25})C=C=O)$

To 2-ethyltetradecanoyl chloride (27 parts) in anhydrous benzene (180 parts) is added trimethylamine (10 parts). The reaction vessel is sealed and maintained at room temperature for 96 hours. The reaction mixture is then heated in an autoclave at 55–60° C. for 6 hours after which it is left standing at room temperature for an additional 18 hours. The trimethylamine hydrochloride (65% of the theoretical amount) is filtered by the indirect method to avoid contamination with atmospheric moisture, and the filtrate is concentrated by distillation under a reduced pressure of 20 mm. of mercury until the solvent is entirely removed. The residue is then fractionated and ethyldodecylethenone boiling at 143–5° C./7 mm. ($n^{27}$D', 1.4482) is obtained (6 parts or 29% of the theoretical amount).

Anal. calc'd. for $C_{16}H_{30}O$: Mol. wt. 240. Found: Mol. wt. 248.

A portion of this ethenone rapidly acylated aniline to yield the anilide of 2-ethyltetradecanoic acid. A mixed melting point determination with an authentic sample showed no depression.

The present invention includes and is generic to any dialkyl and substituted dialkyl ethenone wherein the two alkyl or substituted alkyl groups contain collectively at least fourteen aliphatic (including cycloaliphatic) carbon atoms. Other specific examples of ethenones include the following: butyldecylethenone, amyldodecylethenone, octadecylhexadecylethenone, γ-cyclohexylbutyldecylethenone, β-methoxyethyltetradecylethenone, δ-carbethoxybutyldecylethenone, $\Delta^9$ octadecenyl $\Delta^7$ hexadecenylethenone.

The present invention is generic to the dehydrohalogenation, with tertiary aliphatic, including cycloaliphatic, amines of secondary acyl halides containing one and only one

CHCOX group (X=halogen) to which are attached two alkyl or substituted alkyl groups containing collectively at least fourteen carbon atoms. These alkyl groups may be substituted with any aliphatic radical inert toward tertiary amines, acyl halides or ethenones, such as the straight and branched chain alkyl, cycloalkyl, carbalkoxy or ether groups. Specific examples include the following: 2-butyldodecanoyl chloride, 2-amyltetradecanoyl chloride, 2-hexyldecanoyl chloride, 2-octyldecanoyl chloride, 2-octadecyloctadecanoyl chloride, 2-(4-cyclohexylbutyl)dodecanoyl chloride, 2-(2-methoxyethyl)hexadecanoyl chloride, 2-(3-carbethoxybutyl)dodecanoyl chloride, or 2-($\Delta^8$-heptadecenyl) $\Delta^{10}$ octadecenoyl chloride. The other substituted acyl halides, e. g., bromides, are likewise operable.

While the choice of amines is limited in that tertiary aliphatic, including tertiary cycloaliphatic, e. g., tertiary aliphatic heterocyclic amines are necessary for the dehydrohalogenation, nevertheless any of these may be used. Aromatic, including aromatic heterocyclic, amines, e. g., pyridine and dimethylaniline do not dehydrohalogenate the above-described acyl halides under the conditions used. Specific suitable amines include trimethylamine, triethylamine, tripropylamine, diethylmethylamine, ethylmethylpropylamine, N-ethylpiperidine, N-isopropylpiperidine, N-methylhexahydroazepine, N-methylpyrrolidine and N,N'-tetramethylethylenediamine. For complete reaction, equivalent quantities of amine and acyl halide are desirable. An excess of one of the reactants is neither harmful nor beneficial except that an excess of amine tends to drive the dehydrohalogenation reaction more rapidly to completion. In some cases, an excess of one or the other of the reactants introduces some difficulty in isolating the product by fractional distillation. Stoichiometric amounts are preferred.

Any solvent which dissolves and is inert toward acyl halides, tertiary aliphatic amines, or ethenones is operable. Thus, a wide variety of solvents, including ethers, aromatic or aliphatic hydrocarbons, aromatic or aliphatic chlorinated hydrocarbons containing inactive halogen atoms, such as trichloroethylene or carbon tetrachloride, are suitable. Chlorinated compounds not suitable as solvents include benzyl chloride and alpha- or beta-chloro ethers. In those cases where the substituted ethenones are isolated by distillation, it is most convenient to choose a solvent boiling either considerably below or considerably above the substituted ethenone, thereby facilitating the fractional distillation of the product from the solvent. Specific suitable solvents include ligroin, benzene, toluene, xylene, chlorobenzene, dichlorobenzene, diethyl ether, dibutyl ether, chloroform, carbon tetrachloride and trichloroethylene.

The amount of solvent may be varied within wide limits. Using 100–200 parts solvent per 0.1 mol part of each reactant has been found satisfactory. The amount of solvent used should be sufficient to dissolve the substituted ethenone, thus facilitating the separation of the insoluble tertiary amine hydrochloride by filtration. It is also feasible to use an excess of the trialkylamine as solvent in cases where the substituted ethenone can be readily separated from the trialkylamine and its hydrochloride. For those uses of ethenones in which the presence of the trialkylamine hydrochloride does no harm, the dehydrohalogenation can be carried out in the absence of a solvent. The reaction may be carried out at any temperature at which the reaction mixture, under the reaction conditions, is not solidified. The process has been applied successfully at temperatures ranging from 0° to 140° C. Furthermore, it has been found that high temperatures promote a more rapid reaction. The process is ordinarily carried out at atmospheric pressure or slightly above, although operation at pressures even considerably above or below atmospheric is feasible.

In the formation of dialkylethenones by dehydrohalogenating a suitable acid chloride, the trialkylamine apparently functions as an acceptor of the hydrogen chloride released from the acid chloride.

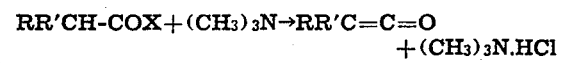
RR'CH-COX+(CH$_3$)$_3$N→RR'C=C=O
+(CH$_3$)$_3$N.HCl

An unexpected property was encountered in the unusual stability of the monomeric dialkylethenones of the present invention. It has hitherto been taught that dialkylethenones (called "keToketenes") polymerize rapidly to dimeric compounds. (Staudinger, Die Ketene, Enke Stuttgart, 1912; Staudinger, Helv. Chim. Acta. 6 294–303 (1923).)

It is therefore surprising that stable monomeric dialkylethenones can exist independently of the dimer, and thus it is surprising to find that long chain dialkylethenones keep their identity as monomers, so far as can be determined, even at temperatures ranging from 0° C. to 150° C. The monomeric ethenones of this invention are unexpectedly and unpredictably stable under all ordinary conditions. Thus, dimethyl, methylethyl-, diethyl-, diallyl-, allylmethyl-, dibenzyl- and dipropylethenones synthesized by (a) dehalogenation of the alpha-bromoacyl bromide, (b) thermal decomposition of the corresponding malonic anhydride, or (c) by thermal decomposition of the mixed malonic acid-diphenylacetic acid anhydride, tedious methods differing from the process of the present invention, are unstable and polymerize (Staudinger, loc. cit.) as follows:

| Ethenone | Percent polymerized | Time in days at 25° C. |
|---|---|---|
| Dimethyl | 100 | 1.25 |
| Methylethyl | 84 | 6 |
| Diethyl | 83 | 48 |
| Dipropyl | 10 | 77 |
| Diallyl | 96 | 11 |
| Methylallyl | 78 | 4 |
| Dibenzyl | Approaching 100 | 1.25 |
| Methylbenzyl | 100 | Few |

To demonstrate clearly this point, the following experiments were performed: (1) In a tube was placed 5 parts of diheptylethenone, $n^{27}_D$, 1.4433. This tube was tightly stoppered and set aside for 6 days at 23–7° C. The tube was then opened and the refractivity of the liquid again determined. Since the refractivity was found to be unchanged, it was concluded that the monomeric diheptylethenone had not polymerized to a measurable extent; (2) In another tube was placed 14 parts of diheptylethenone. This tube was then sealed and heated to 100° C. for 6 days. At the end of this time the tube was cooled, opened and its refractivity found to be the same as it had been when first placed in the tube. Furthermore, distillation at 133–135° C./5 mm. yielded no perceptible non-volatile residue. The previously determined boiling point for diheptylethenone was also 133–135° C./5 mm.

An unique utility of the higher molecular weight dialkylated ethenones lies in their ability to waterproof fibrous materials as disclosed in William E. Hanford's copending application Serial No. 234,842, filed October 13, 1938.

Ethyldodecylethenone, as an example, imparted waterproofing effects to cellulosic fibrous materials. In general, the higher the carbon content, the more pronounced are the waterproofing effects.

These ethenones are also useful wherever an acylating agent is desired which furnishes no by-products such as hydrogen chloride. The products need not be isolated from the solvent for subsequent reactions and applications.

The term "aliphatic" in the claims includes in its scope "cycloaliphatic" unless limiting expressions used such as "acyclic," "open chain" and the like restrict the scope.

The above description and examples are intended to be illustrative only. Any modification of or variation therefrom which conforms to the Anal. calc'd. for $C_{16}H_{30}O$: Mol. wet., 240.

spirit of the invention is intended to be included within the scope of the claims.

I claim:

1. Process of preparing dialkylethenones which comprises reacting a secondary aliphatic monoacyl halide RR′CHCOX, wherein R and R′ are selected from the group consisting of alkyl and substituted alkyl, groups containing collectively at least fourteen aliphatic carbon atoms and X is halogen, with an aliphatic tertiary amine, the reaction and the isolation of the dialkylethenone being carried out under anhydrous conditions.

2. Process of preparing dialkylethenones which comprises reacting a secondary aliphatic monoacyl halide RR′CHCOX, wherein R and R′ are selected from the group consisting of alkyl and substituted alkyl groups containing collectively at least fourteen aliphatic carbon atoms and X is chlorine, with an aliphatic tertiary amine, the reaction and the isolation of the dialkylethenone being carried out under anhydrous conditions.

3. Process of preparing dialkylethenones which comprises reacting a secondary aliphatic monoacyl chloride containing at least sixteen aliphatic carbon atoms with an aliphatic tertiary amine, the reaction and isolation of the dialkylethenone being carried out under anhydrous conditions.

4. Process of preparing dialkylethenones which comprises reacting a secondary aliphatic monoacyl chloride containing at least sixteen aliphatic carbon atoms at 0–140° C. with an aliphatic tertiary amine, the reaction and isolation of the dialkylethenone being carried out under anhydrous conditions.

5. Process of preparing dialkylethenones which comprises reacting a secondary aliphatic monoacyl chloride containing at least sixteen aliphatic carbon atoms in an inert solvent with an aliphatic tertiary amine, the reaction and isolation of the dialkylethenone being carried out under anhydrous conditions.

6. The process of claim 5, wherein the aliphatic tertiary amine is trimethylamine.

7. The process of claim 5, wherein the aliphatic tertiary amine is triethylamine.

8. The process of preparing diheptylethenone which comprises reacting 2-heptylnonanoyl chloride with trimethylamine in an inert solvent, the reaction and isolation of the diheptylethenone being carried out under anhydrous conditions.

9. The process of preparing ethyldodecylethenone which comprises reacting 2-ethyltetradecanoyl chloride with trimethylamine in an inert solvent, the reaction and isolation of the ethyldodecylethenone being carried out under anhydrous conditions.

10. A stable, monomeric, dialkylethenone of the formula RR′C=C=O, wherein R and R′ are selected from the group consisting of alkyl and substituted alkyl, groups containing collectively at least fourteen aliphatic carbon atoms.

11. A stable, monomeric, aliphatic dialkylethenone of the formula RR′C=C=O, wherein R and R′ are hydrocarbon alkyl groups collectively containing at least fourteen aliphatic carbon atoms.

12. Ethyldodecylethenone.

13. Diheptylethenone.

JOHN CARL SAUER.

CERTIFICATE OF CORRECTION.

Patent No. 2,268,169.                                                   December 30, 1941.

JOHN CARL SAUER.

It is hereby certified that error appears in the printed specification of the above numbered patent requiring correction as follows: Page 3, first column, line 74, strike out "Anal. calc'd. for $C_{16}H_{30}O$: Mol. wet., 240."; and that the said Letters Patent should be read with this correction therein that the same may conform to the record of the case in the Patent Office.

Signed and sealed this 3rd day of March, A. D. 1942.

(Seal)                                               Henry Van Arsdale,
                                                  Acting Commissioner of Patents.